Dec. 5, 1933.     E. ZURMUHLE     1,938,164
INTAKE ARRANGEMENT FOR INTERNAL EXPLOSION ENGINES
Filed Oct. 5, 1931
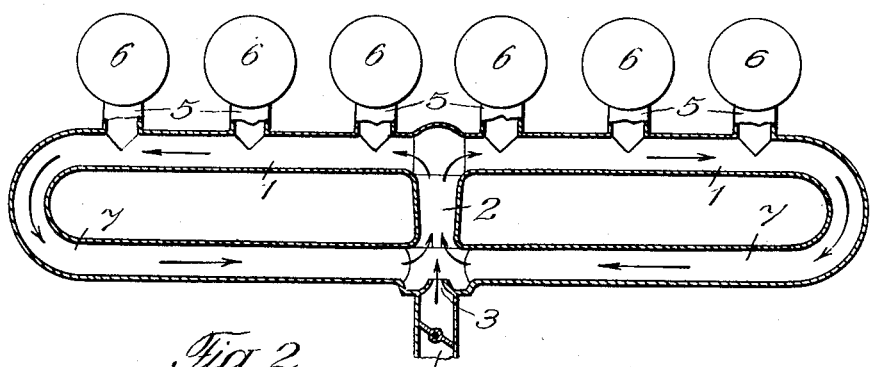
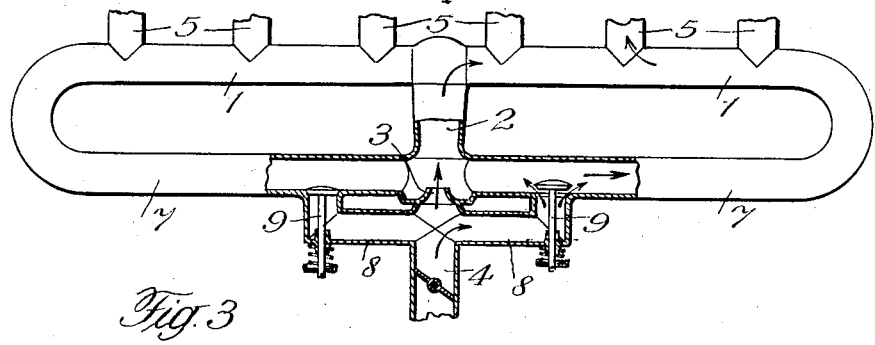
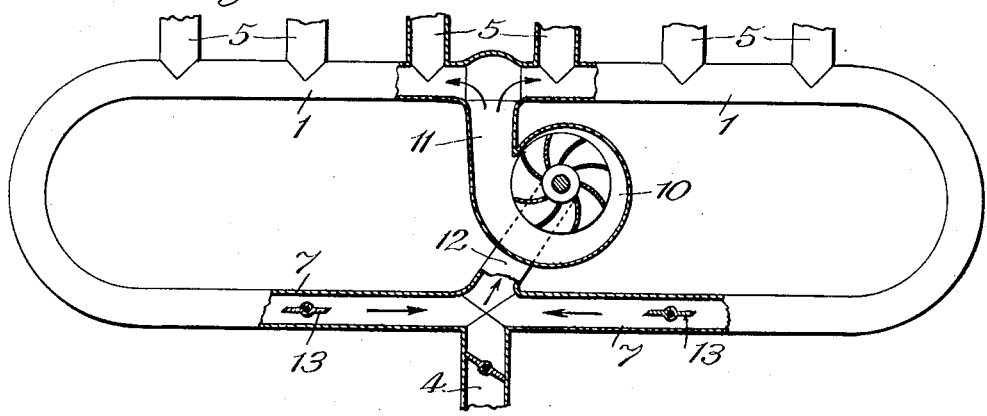
Inventor:
Ernst Zurmuhle
by Sommers & Young
Attorneys Patented Dec. 5, 1933

1,938,164

UNITED STATES PATENT OFFICE 1,938,164

INTAKE ARRANGEMENT FOR INTERNAL EXPLOSION ENGINES

Ernst Zurmuhle, Bombay, British India

Application October 5, 1931, Serial No. 567,006, and in Germany October 10, 1930

5 Claims. (Cl. 123—52)

The present invention relates to improvements in intake arrangements for internal explosion engines and particularly for engines having a plurality of cylinders arranged in line and has for its object to provide means for effectively distributing the combustible mixture to the cylinders of the engine.

With engines having a plurality of cylinders, which are generally used now-a-days for driving vehicles, the distribution of the combustible mixture offers difficult problems as a high maximum output as well as economy and a uniform running over the whole range of the adjustment of the throttle valve is desired. High maximum outputs require a high volumetric efficiency and thus an intake or suction tube of large cross-sections. When the engine is throttled or runs at low speeds the speeds of the flow of the mixture decrease so rapidly that fuel is apt to separate from the mixture, whereby a uniform composition of all the cylinder charges is no longer present. Therefore a small cross-section of the intake tube is necessary when driving with the throttle almost closed and at small speeds of the engine.

With engines having six or more cylinders in line the problem becomes more difficult owing to the greater length of the intake tube on the one hand and to the superposition of the strokes on the other hand. Thereby often oscillations in the column of combustible mixture occur which may also give rise to a separation of atomized fuel. Not only mixtures of different qualities but also different quantities are obtained in different cylinders. Thereby the running qualities as well as the efficiency of the engine are affected.

In practice engines intended for high maximum outputs and having a large intake tube are used and an effective running in throttled condition or at low speeds is not aimed at. For other purposes engines having a large cylinder capacity and an intake tube of small dimensioned cross-sections are built. Thereby an elastic running at low speeds and outputs is obtained, but not a complete utilization of the cylinder capacity i. e. a high maximum output. Further a large number of expedients have been resorted to in order to improve the running qualities of the engines, for instance tubes of square cross-sections and sharp deviations of the direction of the flow of the combustible mixture to assist the formation of eddies, and means to heat the mixture above its dew point for preventing a separation of the fuel. However all these measures reduce the volumetric efficiency of the engine. A two-fold carburetor or several carburetors have also been proposed but they show the drawback of being expensive and require a difficult adjustment.

It has already been proposed to maintain a high velocity of the explosive mixture in the manifold by connecting a further tube to the ends of the manifold and inserting an impeller in those tubes to cause the mixture to circulate in these tubes. A separate throttle valve has been provided in every branch connecting the manifold to every cylinder and the carburetor has been connected to the further tube without a throttle valve therebetween. The regulation of the proportion of the mixture by the difference in pressure in front and at the rear of the throttle valve of the carburetor cannot be effected, an ordinary carburetor cannot be used in the known arrangement. Further the provision of a plurality of throttle valves complicates the arrangement considerably and increases the possibility of a brake-down. Moreover a uniform supply of mixture to the cylinders cannot be obtained, particularly at small loads and speeds of the engine.

These drawbacks are now overcome by the subject-matter of the present invention, in that a circulating device preferably operated by the fuel-air-mixture, the distributing manifold and one or more return conduits form one system in which part of the mixture circulates continuously in order to obtain a homogenous mixture of air and fuel when the engine runs in throttled condition or at medium and low speeds, the circulating device forming a third connection between the manifold and the return tubes and being arranged in the middle of the length of the manifold. This system ensures a uni-directional and almost uniform movement of fuel-air-mixture in the manifold. A volumetric efficiency is obtained that is uniform for all the cylinders and a condensation or precipitation of the fuel is avoided. The good distribution of the mixture permits to obtain not only a higher overall-efficiency and a more uniform running of the engine at any load and speed but also an increase of the maximum output by increasing the cross-sections of the induction pipes while omitting a heating of the combustible mixture.

Constructional examples of the subject-matter of the invention are illustrated on the accompanying drawing, in which Fig. 1 shows a longitudinal sectional view of the induction conduit, Fig. 2 shows a longitudinal sectional view of the inductive conduit with details of a device for increasing the maximum output of the engine, and Fig. 3 shows in a longitudinal section a further constructional example particularly adapted for engines provided with charging compressors.

Referring now to the drawing 1 denotes the induction manifold connected to the carburetor 4 by means of an injector for the combustible mixture and consisting of the nozzle 3 and the diffusor 2. The outer ends of the manifold 1, which is connected by means of short branches 5 to the inlet valves of the engine cylinders 6, are in connection with the suction side of the injector 2, 3 by return conduits 7.

The injector 2, 3 forms together with the manifold 1 and the return conduits 7 two similar circulation conduits, in which a portion of the combustible mixture is kept in a continuous circulation by the action of the injector as indicated by the arrows. Thereby a higher velocity of the combustible mixture is generated in the manifold; the mixture does never stagnate and it does not change its direction of flow whereby a high degree of uniformity of the mixture is ensured for all the cylinders.

In Fig. 2 the conduits 8 are connected with their one ends to the suction tube intermediate of the carburetor 4 and the nozzle 3 and with their other ends by the intermediary of valves 9 to the return conduits 7. This arrangement serves for obtaining maximum outputs at high speeds. The valves 9 are opened either manually or automatically by the pressure difference in front and at the rear of the injector nozzle 3. Thereby the action of the injector is diminished and the circulation of the mixture, which is not necessary for high outputs and high velocities of the mixture, is disturbed. In the return conduit 7 the direction of flow of the mixture is reversed so that the return conduit acts as additional suction conduit. The thereby obtained increase of the cross-section of the suction conduit permits to obtain an increase of the volumetric efficiency.

In Fig. 3, 10 denotes a blower replacing the injector 2, 3 of the described examples and having a larger delivery than the suction volume of the engine. The suction conduit 12 of the blower 10 is connected to the return conduits 7 as well as to the carburetor 4; the pressure conduit 11 of the blower 10 delivers the mixture into the manifold 1. A portion of the mixture circulates continuously through blower, manifold and return conduit.

The blower may be constructed as compressor, in which case it works as circulating pump as long as the throttle valves 13 are open; when the latter are partly open the blower works as compressor and as circulating pump and when the throttle valves 13 are closed it works as compressor for pre-compressing the charging mixture.

I claim:

1. An intake arrangement for internal explosion engines having a plurality of cylinders disposed in line and being interposed between the latter and the carburetor, comprising in combination, a straight manifold tube, return conduits having at least the same cross-sectional area as said manifold tube and connected to the ends of the latter, means interposed between said manifold tube and said return conduits and forming a third connection between them arranged in the middle of the manifold and adapted to cause a circulation of a portion of the combustible mixture in said manifold tube and said return conduits, additional tubes interposed between the carburetor and said return tubes, and valves for controlling the connections between said additional tubes and said return conduits, said additional tubes serving as additional suction tubes for increasing the volumetric efficiency at high outputs and high velocities of the engine.

2. An intake arrangement for internal explosion engines having a plurality of cylinders disposed in line and being interposed between the latter and the carburetor, comprising in combination, a straight manifold tube, return conduits having at least the same cross-sectional area as said manifold tube and connected to the ends of the latter, a blower interposed between said manifold tube and said return conduits and forming a third connection between them arranged in the middle of the manifold and adapted to cause a circulation of a portion of the combustible mixture in said manifold tube and said return conduits, the delivery of said blower being considerably larger than the stroke volume of the engine cylinders, and throttle means interposed in said return conduits; said blower acting as circulating pump when said throttle means are open and as compressor for pre-compressing the charge when said throttle means are closed.

3. In a fuel intake for internal combustion engines, in combination with a plurality of cylinders, a distributing manifold, one end of a fuel diffusing conduit connected to the distributing manifold, return conduits extending from the ends of the distributing manifold to the other end of the diffusion conduit, and an injector nozzle spaced from and directed toward the said other end of the diffusion conduit, whereby the fuel in said return conduit is drawn back into the distributing manifold.

4. In a fuel intake for internal combustion engines, a fuel circulating intake manifold, a fuel conduit connected to said intake manifold, additional conduits extending from said fuel conduit to said manifold, control valves between said additional conduits and said manifold, whereby the cross-sectional area of the fuel induction into the manifold may be increased.

5. In a fuel intake for internal combustion engines, a fuel circulating intake manifold, a fuel conduit connected to said intake manifold in such a manner as to cause circulation of the fuel therein, valve controlled conduits leading from the fuel conduit to the return tubes of the said circulating manifold, for inhibiting a circulation of the said fuel and increasing the cross-sectional area of the fuel induction into the manifold.

ERNST ZURMUHLE.